Jan. 16, 1968   J. H. CLACK   3,363,519
COMBINED SERVICE AND EMERGENCY BRAKE SYSTEM APPARATUS
Original Filed June 4, 1962   7 Sheets-Sheet 1

INVENTOR.
JAMES H. CLACK
BY
Attorneys

Jan. 16, 1968  J. H. CLACK  3,363,519
COMBINED SERVICE AND EMERGENCY BRAKE SYSTEM APPARATUS
Original Filed June 4, 1962  7 Sheets-Sheet 2

INVENTOR.
JAMES H. CLACK
BY
*Fehr and Swain*
*Attorneys*

Jan. 16, 1968  J. H. CLACK  3,363,519
COMBINED SERVICE AND EMERGENCY BRAKE SYSTEM APPARATUS
Original Filed June 4, 1962  7 Sheets-Sheet 3

Jan. 16, 1968           J. H. CLACK           3,363,519

COMBINED SERVICE AND EMERGENCY BRAKE SYSTEM APPARATUS

Original Filed June 4, 1962           7 Sheets-Sheet 4

Jan. 16, 1968   J. H. CLACK   3,363,519
COMBINED SERVICE AND EMERGENCY BRAKE SYSTEM APPARATUS
Original Filed June 4, 1962   7 Sheets-Sheet 5

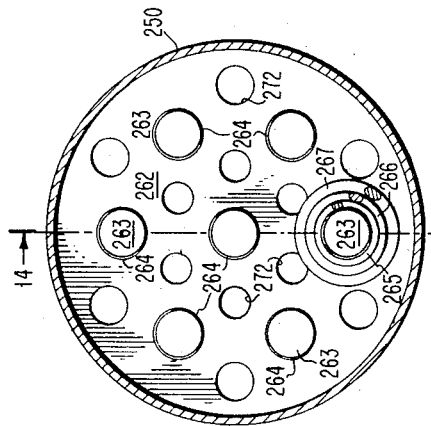
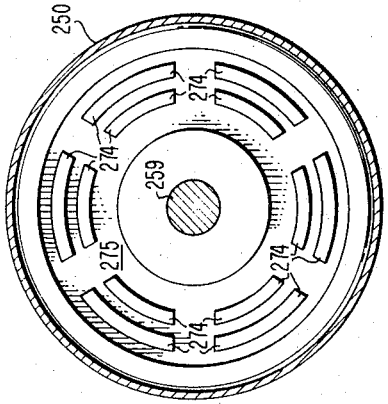
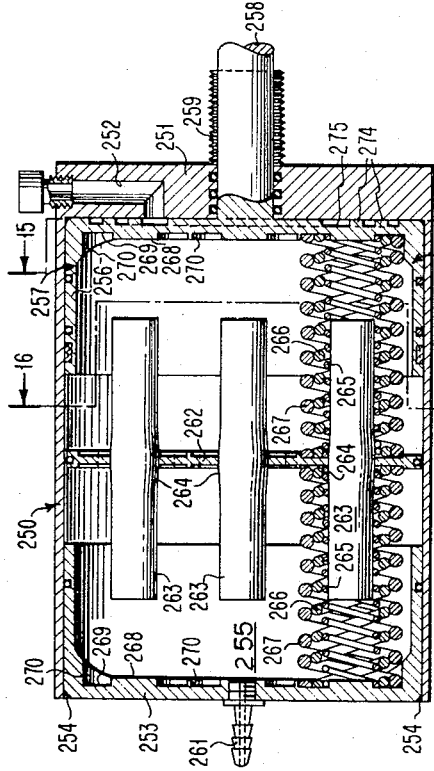
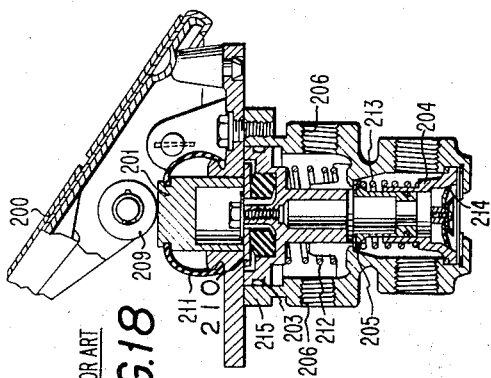
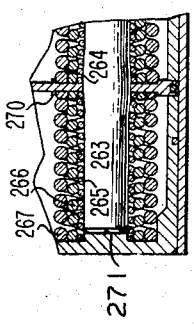

Jan. 16, 1968   J. H. CLACK   3,363,519
COMBINED SERVICE AND EMERGENCY BRAKE SYSTEM APPARATUS
Original Filed June 4, 1962   7 Sheets-Sheet 7

United States Patent Office 3,363,519
Patented Jan. 16, 1968

3,363,519
COMBINED SERVICE AND EMERGENCY
BRAKE SYSTEM APPARATUS
James H. Clack, 2611 Niagara Way,
Sacramento, Calif. 95826
Original application June 4, 1962, Ser. No. 199,813. Divided and application Mar. 21, 1963, Ser. No. 267,398. Divided and application Dec. 30, 1963, Ser. No. 334,505, now Patent No. 3,272,566. Again divided and this application Apr. 25, 1966, Ser. No. 544,991
10 Claims. (Cl. 92—130)

This application is a division of application Ser. No. 199,813, filed June 4, 1962, for Safety Brake System, now abandoned, of application Ser. No. 267,398, filed Mar. 21, 1963, for Combined Service and Emergency Brake System Apparatus, now abandoned, and of application Ser. No. 334,505, filed Dec. 30, 1963, for Combined Service and Emergency Brake System Apparatus, now Patent No. 3,272,566, and relates to brake systems and associated apparatus for wheel supported vehicles and more particularly the brake actuator units thereof. This invention is particularly useful for trucks, trailers, tractors and the like.

In the main, for normal service operation, trucks and trailers utilize brakes operated by fluids such as air or hydraulic liquid. Generally, pressure developed by a pump or air compressor is transmitted through appropriate control valves to apply braking forces on the wheels. By and large, these systems have worked well. However, rupture of pressure hoses, diaphragms, or mechanical breakdown of the compressor, pump or a valve have resulted, in the past, in disasters. Therefore, these systems, wherein fluid pressure is used to apply the brakes, oftentimes further employ mechanical brake mechanisms as a back-up for emergency operation. One emergency system, includes a cylinder and spring-loaded piston connected in tandem to drive the same brake-shoe driving connection as operated by the fluid system. The spring is restrained by the fluid pressure of the system. When the fluid pressure fails, the spring takes over to operate the driving connection. Thus, the driving connection is powered in service operation by fluid and in emergency operation by the spring. Arrangements of this kind have been referred to in the trade as "piggyback" units.

Piggyback units necessarily are rather long. Notwithstanding their extended length, however, they can provide only a relatively short throw. A short throw can contribute to the problem of "fading" wherein, due to heating, the drums expand so as to place themselves out of reach of the shoes (linings). Furthermore, the use of large springs to apply braking forces has not been entirely satisfactory over an extended life due to their shorter flexing life as compared to smaller springs.

Air equipped systems also possess a seemingly inherent weakness, in that moisture tends to accumulate in the system. Extremely cold weather can cause this moisture to freeze and crucial operating components either will not start to work until thawed or will, even worse, be permanently damaged. Also, rust and deterioration through dirt, grit and air-borne pollutants act to an accelerated degree on pneumatic braking systems.

It is generally an object of this invention to provide means for operating the brakes of a wheel supported vehicle in a manner which overcomes the foregoing and certain other problems of prior systems.

It is another object of the invention to provide a simplified means for applying the brakes to a vehicle in both service and emergency operation.

It is another object of the invention to provide a brake actuator for a system in which the brakes are operative any time the fluid pressure members are rendered inoperative, thereby providing a "fail-safe" system.

It is a more particular object of the invention to provide an actuator for a combination service and emergency brake system wherein energy for advancing the brake shoes to brake applying condition during both service and emergency operation is derived substantially entirely by releasing stored energy from a spring biasing means of the actuator.

Use of spring forces to apply the brake of a vehicle is inherently a faster acting approach to a fluid brake system and has a number of other inherent advantages over systems where, for example, pneumatic pressure urges the brakes to brake applying position.

The objective of providing a service brake system using actuators wherein spring forces act to apply the brakes under pneumatic or hydraulic control of the springs raises a number of problems, however. These problems, until now, have virtually relegated the use of springs in this manner to "parking" brake status.

Large forces must be available. As mentioned, however, springs of smaller size have a more desirable flexing life than the larger sizes and are, therefore, to be preferred. Further, to overcome the problem of fading, the travel of the brake applying lever arm should be capable of moving through a relatively wide angle of displacement to fully rotate the camming element. This requires a rather extended movement of the brake piston, inasmuch as the lever arm must be long enough to apply sufficient braking forces at the wheels using conventional fluid pressures in the system. Thus, the need for the presently used, rather long lever arms, is understandable, but imposes a correspondingly long actuator movement if fading is to be overcome.

In short, to use springs in a service system, among other requirements the springs should have good flexing characteristics under all conditions of temperature and provide a long actuator movement.

In addition, spring generated forces must provide trouble-free maintenance and avoid unsatisfactory diminution of force at full displacement of the actuator.

It is generally considered that helical springs tend to break from fatigue midway between their ends. I have observed, however, that the point of fracture is more properly to be identified with the midpoint between the sprung and unsprung masses that are separated by the springs. Where a single spring separates the two masses, there would appear to be substantially no difference in the point of fracture. Therefore, to develop a long throw for the actuator, I have found the use of tandemly disposed springs, separated by an alignment plate, to be particularly effective.

A further problem encountered in any attempt to utilize spring forces for service braking purposes, is that helical springs tend to impart an objectionable twisting to the drive movement of the piston rod. This twisting can cause fracture of the rod if it is held fixed with a clevis. Furthermore, when several springs are used together, this twisting causes buckling or "scrambling" of the springs thereby impairing proper functioning.

Accordingly, it becomes still further objects of the invention to provide actuator devices for a brake system of the foregoing kind, in which these and other problems have been resolved.

These and other objects will be more readily apparent from the following description of preferred embodiments when taken in conjunction with the accompanying drawings, in which:

FIGURE 14 is a center-line section view of a brake actuating unit according to another embodiment;

FIGURE 15 is a section view taken along the lines 15—15 of FIGURE 14;

FIGURE 16 is an end view along a section at lines 16—16;

FIGURE 17 is a section view of a portion of the actuator shown in FIGURE 14 in its compressed condition;

FIGURE 18 shows a prior art valve construction;

Figures 20, 21:
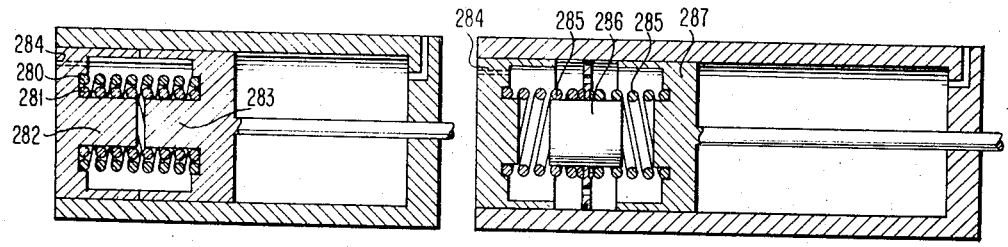

FIGURE 20 schematically shows a simplified embodiment of a brake actuating unit; and FIGURE 21 schematically shows another simplified embodiment of a brake actuating unit.

Ordinarily, in brake systems, as carried by wheel supported vehicles having an operator's compartment, brake drums are provided including a friction surface. Co-acting brake shoes, carrying a friction lining, are arranged for movement into and out of engagement with the friction surface in order to apply and release the brakes. Not uncommonly, an operating member, such as a lever arm, is movable between brake applying and brake releasing positions in order to control the movement of the brake shoes.

In general, brake actuating apparatus has herein been provided comprising a connecting member operably connected to move the brake shoes between brake applying and brake releasing positions. The apparatus includes a cylinder, a piston within the cylinder, and resilient biasing means disposed to urge the piston with respect to the cylinder in order to advance a connecting member to apply the brakes for both service and emergency operation. The apparatus has been simplified to the point where energy for advancing the connecting member during both service and emergency operation is derived substantially entirely by releasing stored energy from the biasing means. Fluid pressure means, operable from the operator's compartment, as by a foot pedal, is arranged for both gradually or substantially instantaneously releasing the stored energy of the biasing means as well as to restore the energy thereof.

The apparatus as above described is adapted for either pneumatic or hydraulic operation. For example, hydraulic operation is shown in FIGURES 1 through 4 wherein the system is generally designated by the reference numeral 12. The system is preferably installed, for example, in a truck or tractor 13, as shown in outline in FIGURE 1. However, its use is equally of value to attendant members, such as a trailer, or in other vehicles which rely on wheels for support and on braking systems for control, such as aircraft.

Many types of hydraulic braking systems exist. All of such systems have in common, a hydraulic reservoir, an accumulator and a pump. The pump, being itself appropriately driven drives hydraulic fluid, under pressure, such as oil, to the various actuating members. In this respect the instant system is no exception.

Figure 1:
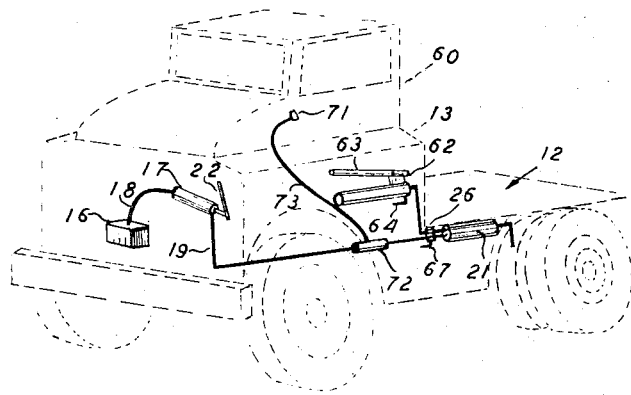
FIGURE 1 is a fragmentary perspective view showing the general arrangement of a system suitable for employing an actuator according to the invention, the system being shown in a typical environment, namely in a truck or tractor member, illustrated in outline.

In other words, any existing or previously known hydraulic service system which includes a pump, accumulator and reservoir 16, often located in the engine compartment, as in FIGURE 1, can be employed. As is well known in the art, return lines to the reservoir, or sump, are required although such return lines are not shown in FIGURE 1 for greater clarity of disclosure.

The service pump drives fluid, under pressure, to a foot brake or cab control valve 17. Conveniently, valve 17 is linked to the brake pedal 22 and can be of rotary, four-way variety, with valve and seat dimensions such that the step of going from open to closed or closed to open is a gradual rather than a substantially instantaneous one.

This is to say, that with the vehicle in normal cruising status (i.e., in service operation), valve 17 is in a condition such that substantially the full pressure exerted by pump 16 makes itself felt through the pump service line 18 and through valve 17 to the main service line 19 and thus, to the brake controlling cylinder 21. While immediate full depression of brake pedal 22 is effective to cut off the pressure entirely and permit full, instantaneous flow-back through the return line to the reservoir, an intermediate or partial displacement of the brake pedal will effect only a corresponding partial pressure line blockage and opening of the return line, thus providing smooth partial braking. Rotary valves capable of accomplishing this result are readily available commercially and thus require, it is felt, no detailed description. Comparable remarks apply to certain other valves subsequently described.

Figure 2:
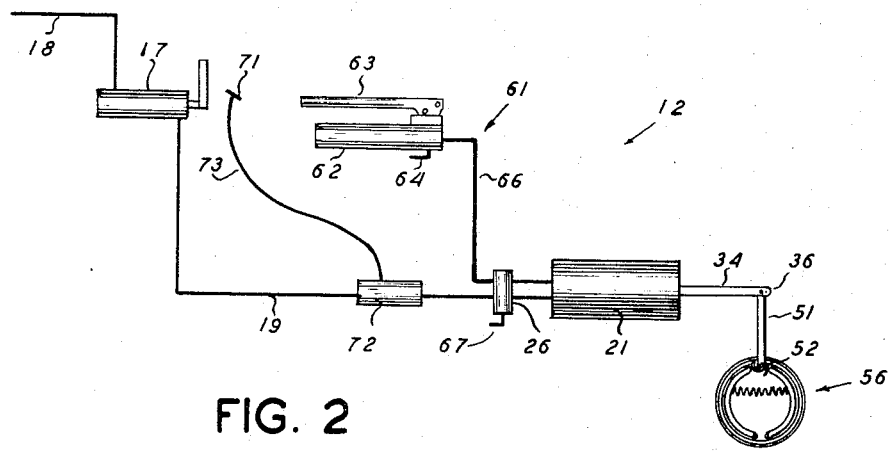
FIGURE 2 is a diagrammatic illustration of the brake system shown in FIGURE 1.

The main service line 19 leads into, and under customary conditions, through a stand-by or post-emergency valve 26 located adjacent cylinder 21. While FIGURES 1 and 2 show only a single, main service line entering stand-by valve 26, it will be realized, as stated above, that there is also a separate return or feed-back line leading to the main pump reservoir. This feed-back line is designated in FIGURES 3 and 4 by the reference numeral 19a.

Returning to line 19 (FIGURES 3 and 4) pressurized fluid in line 19 can make its influence felt in the hydraulic pressure chamber 31, located adjacent the left-hand end of cylinder 21.

Figure 3:
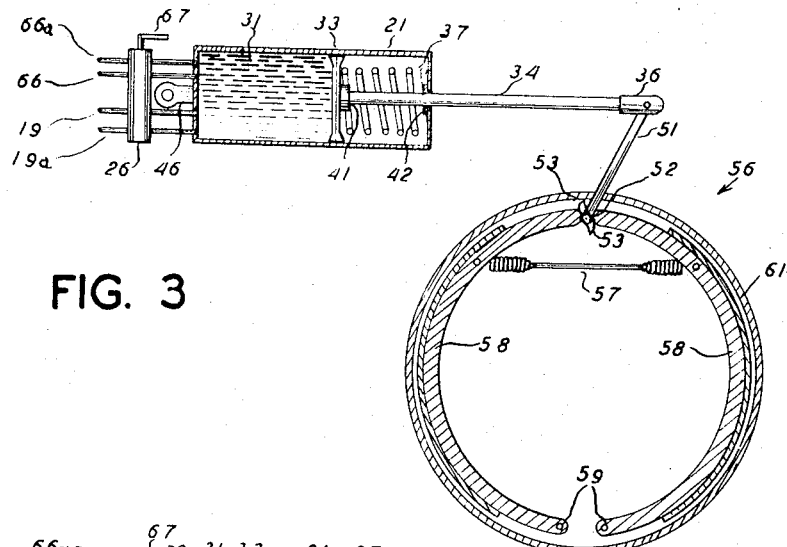
FIGURE 3 is a fragmentary view, partially in section of components of the system shown in FIGURE 1, shown in "brake off" position.
Figure 4:
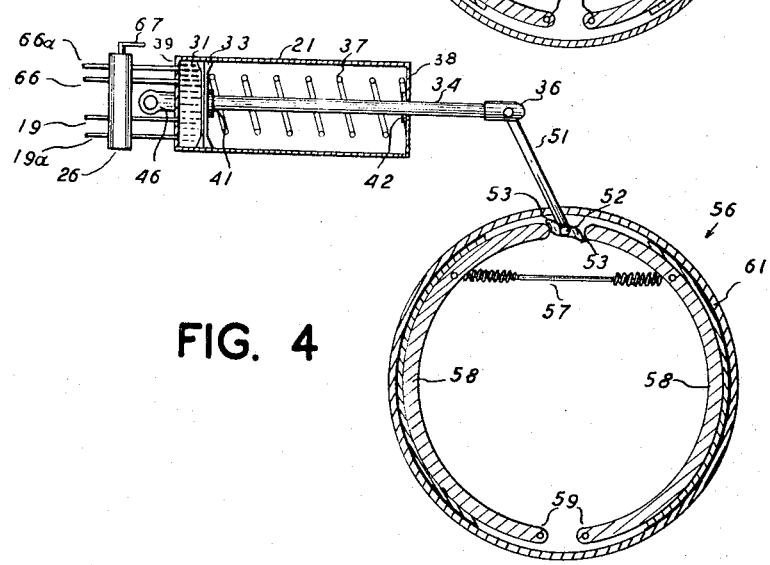
FIGURE 4 is a view comparable to that of FIGURE 3 but with the components in a "brake-set" position.

FIGURE 3 schematically represents a "brake-off" situation. Here, the full pressure of line 19, through the normally fully open stand-by valve 26, is exerted through the fluid filled chamber 31 and against the piston head 33 of a plunger 34 projecting through and beyond the right-hand end of cylinder 21 and terminating in a clevis 36.

A helical spring 37, having a very powerful spring constant is interposed between piston head 33 and the rod end 38 of cylinder 21 and serves to bias piston head 33 in a left-hand direction toward the head end 39 of the cylinder. Appropriate flanges 41 and 42 (FIGURES 3 and 4) assist in centering or maintaining spring 37 in proper axial alignment.

Under most circumstances, smooth operation of the main cylinder is enhanced by providing on the left-hand end of cylinder 21 an eye-bolt bracket 46 adapted to be pivotally mounted on an adjacent frame or chassis member (not shown) of the vehicle, thus enabling the cylinder to rock slightly to conform to the requirements of the extensible and retractable plunger member 34. In this situation the fluid lines between valve 26 and cylinder 21 would preferably be flexible to accommodate the slightly varying attitude of the cylinder.

Translation of plunger 34 and clevis 36 is reflected in a reciprocating, or rocking movement, of a lever 51 pivotably mounted at one end on clevis 36 and secured at the other end to a conventional cam shaft 52 of any standard vehicle brake mechanism, such mechanism being generally characterized by the reference numeral 56.

The brake mechanism, in known manner, is actuated or deactivated by angular rotation of cam shaft 52 (and cams 53) in one direction or the other. It is, therefore, not believed necessary to further describe the structure and operation in detail except to state that a tension spring 57 connected to brake shoes 58 tends to pull the shoes inwardly toward each other about a pair of anchor pins 59 as a pivot, and thus deactivate or release the brake by separating shoes 58 from the encompassing brake drum. As is known, the brake drum has a friction surface which co-acts with the friction lining carried by brake shoes 58. Thus, when oppositely urged by cams 53, the brake shoes are moved to brake applying position whereby the linings engage the friction surface of the drums.

As appears most clearly in FIGURE 3, pressurized fluid from main service line 19 is, under customary cruising conditions, effective to urge the piston in a right hand direction to overcome the leftward urging of spring 37. As a consequence, spring 37 is compressed and plunger 34, cam shaft 52 and the brake are in "off" position.

Should pressure in line 19 and chamber 31 drop, however, the urging of spring 37 will drive the plunger to the left and overcome the force of spring 57. Thus, the cam shaft is rotated in an opposite direction such that the brake will be in an "on" or "set" position. This situation could occur as a result of many different happenings, the most common, perhaps, being a breakdown of the hydraulic pump or a rupture or leak in the feed lines or valves.

Upon happening of such emergency, the brakes will be set and the vehicle will come to a halt. It is to be noted that while only one brake cylinder is shown in the figures, in actual practice a number of cylinders will be employed for braking the several wheels of the vehicular equipment.

After the vehicle is stopped the operator may effect such repairs to the system as are possible. I have, therefore, provided a convenient stand-by or post-emergency system which is capable of restoring the cylinders and the attendant mechanism to operative condition.

This stand-by system, generally designated by the reference numeral 61 includes a separate reservoir and pump 62 located in a convenient position such as at one end of the driver's seat (not shown) in cab 60. A hand operated lever 63 enables the operator to build up hydraulic pressure in pump 62 and, by suitable orientation of a valve handle 64, to transmit this pressure into a stand-by feed line 66 leading through stand-by valve 26 and into chamber 31 of cylinder 21.

As is apparent, valve 64 controls the flow of fluid in both pressure line 66 and return line 66a.

Valve 26 serves a somewhat similar purpose in that suitable orientation of the cock 67 determines whether main service pressure and return lines 19, 19a, respectively, on the one hand, or stand-by pressure and return lines 66, 66a, respectively, on the other hand, shall be in operation. In other words, rotation of cock 67 cuts out lines 19, 19a at the time lines 66, 66a are cut in, and vice versa. Valve 26 is also capable of turning off all lines in the event of cylinder failure.

Stand-by system 61 enables the operator to reactivate the braking system and by pumping by hand, even while driving, he can maintain pressure and drive the vehicle to a repair facility. Should it become necessary to set the brakes while driving under stand-by condition it is only necessary for the driver to reach down with his left hand and rotate valve handle 64 until line 66a is placed in communication with the pump reservoir. Under this condition, the biasing effect of spring 37 will urge piston head 33 in the lefthand direction (FIGURES 3 and 4) and force fluid outwardly through return line 66a. After braking has been effected, the driver turns handle 64 back to service position for cruising and pumps with handle 63 to restore pressure in cylinder 21 and thereby deactivate the brakes.

After the necessary repairs are made, the system is switched from stand-by back to main service.

For run-away or comparable situations, I have provided, at a convenient location in cab 60, an emergency or "panic button" 71 and an attendant quick-acting high volume bleed valve 72 located in lines 19. Valve 72 is actuated by a Bowden or push wire 73 leading from button 71. Upon operating button 71, valve 72 immediately commences, and continues, to exhaust fluid to atmosphere, thus quickly dropping pressure in the line and permitting all the actuating springs on all the brakes to set the brakes quickly and fully. Concurrently, valve 72 cuts off further flow from pump 16.

Emergency valve 72 would be of special use where the driver determines that foot valve 17 is not sufficient under the circumstances.

As thus described, it will be readily evident that the foregoing system employs in general a spring biasing means which stores substantially the entire energy for applying brakes in both service and emergency operation. As shown in FIGURES 5 through 10 a pneumatically operated embodiment of the above sytem is described wherein pneumatically operated fluid pressure means serve to control release of the stored energy of the spring biasing means, as well as to restore such energy as is expended during braking.

Figures 5, 10:
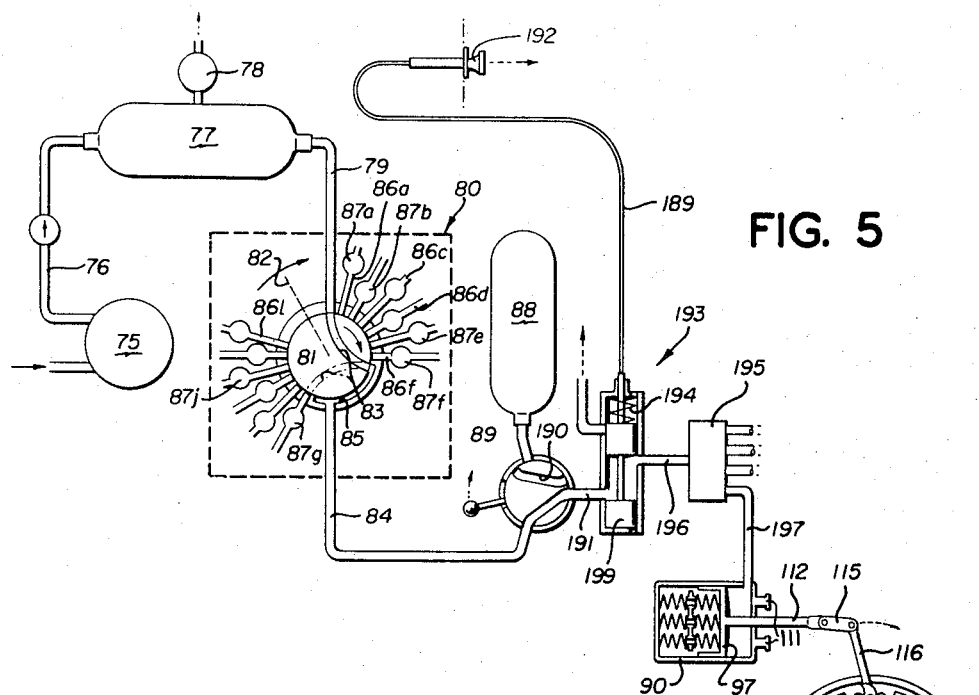
FIGURE 5 shows diagrammatically another embodiment of a system suitable for using an actuator according to the invention.
FIGURE 10 shows the actuator of FIGURE 6 arranged to pull the brake lever to a brake set position.

The system, shown generally in FIGURE 5, includes fluid pressure means operable from the operator's compartment for both gradually or substantially instantaneously releasing stored energy from the spring biasing means and for restoring the energy. An air pump or compressor unit 75 connects via line 76 and a check valve to discharge into an air tank 77 equipped with a conventional relief valve 78. Tank 77 leads via line 79 to suitable valve means designated generally by the reference numeral 80.

Means 80 serves to connect fluid pressure to brake cylinders 90 or to vent air therefrom gradually or suddenly for both service and emergency operation. Valve means 80 (FIGURE 5), diagrammatically provides the various operations to control brake cylinders 90 and can, of course, be constructed in any suitable manner.

Accordingly, a rotationally movable distribution member 81, responsive to movement of a foot pedal (represented by movement of dashed line 82) carried in the cab of the vehicle, serves either to pressurize or vent the brake cylinders to a selected pressure. Member 81 is formed with a passageway or channel 83 which makes connection between a line 84, which transfers air to and from cylinders 90, and one of several vent lines 86. Between line 84 and member 81 a manifold 85 is provided to extend around a substantial portion of the periphery of the member 81. A number of vents designated 86a, 86b, 86c, etc., are distributed around the housing of member 81 and extend generally radially therefrom. Each vent 86 is provided with a pressure relief means such as units designated 87a, 87b, 87c, etc., respectively. Each pressure relief unit 87 is set to relieve brake cylinder air pressure down to a predetermined level and hold the pressure at that level. For example, relief means 87a can be set to relieve air pressure exhausting via vent 86a to a level of 115 p.s.i. Unit 87b can be set to establish a lower air pressure such as 110 p.s.i. In the condition shown, valve means 80 serves to connect compressor 75 via line 79, channel 83, manifold 85 and line 84 to apply fluid pressure to brake cylinders 90. Clockwise rotation of member 81, on the other hand, serves to vent brake cylinder air pressure from line 84 via via manifold 85 and channel 83 to any one of vents 86.

As noted above, braking forces for both service and emergency operation are applied at the wheels from the stored energy in the spring biasing means located in cylinders 90, whereby venting air from the cylinders 90 releases the spring forces. These same spring forces will also act whenever there is partial or complete failure of the air supply. The driver of the vehicle will notice a certain dragging on the brakes and be led to effect repairs. Should failure of the air supply leave the brakes fully applied, it may strand the vehicle in an awkward circumstance. Therefore, means for emergency release of the brakes have been provided.

Means for emergency application of the stored energy in the spring biasing means to move the brake shoes to brake applying position are provided. Thus, if for any reason, venting of air pressure from cylinders 90 via valve means 80 is ineffective to cause the spring biasing means to apply braking forces at the wheels, a "panic button" 192 can be pulled. Button 192 is carried in the cab of the vehicle and serves to operate a three-way valve 193. Valve 193 is spring-loaded by spring 194 to a condition whereby line 191 normally leads to brake cylinders 90 via a manifold and manifold connection 195, 196 respectively. Thus, normally, air is directed from manifold 195 to and from each of the vehicle's brake cylinders 90 by means of piping 197 connected to each. For emergency operation, valve 193 is provided with a vent 198 exhausting to atmospheric pressure whereby pulling button 192 serves via a Bowden wire connection 189 to move the spool 199 upwardly to connect vent 198 to connection 196, thereby directly venting all brake cylinders 90 quickly to atmospheric pressure.

For post-emergency release of the brakes, a cylinder 88 of compressed gas, such as air or carbon dioxide, is connected to a two-postion valve 89 operated by a lever in the cab of the vehicle. Slight rotation of valve 89 serves to couple cylinder 88 to line 191 and at the same time serves to disconnect line 84 from same. Accordingly, fluid pressure from cylinder 88 serves to overcome the spring force and releases the brake shoes.

In normal service operation, movement of foot pedal (82) serves to rotate member 81 to interconnect line 84 via channel 83 to any one of vents 86. Thus, slight clockwise rotation of member 81 serves to release air pressure in the brake cylinders 90 to less than full pressure so as to partially release the stored energy of the resilient biasing means. As this energy is partially released, the brakes are correspondingly applied. Further, clockwise rotation of member 81 serves to connect subsequent vents 86 to drop the air pressure in cylinders 90 as desired for commensurately increased braking. Release of foot pedal (82) serves to return member 81 to the position shown in FIGURE 5 under the urging of any suitable resilient means (not shown). While means 89 is shown as operating by discrete steps, any suitable variable relief means can be employed therefor.

Figure 11:
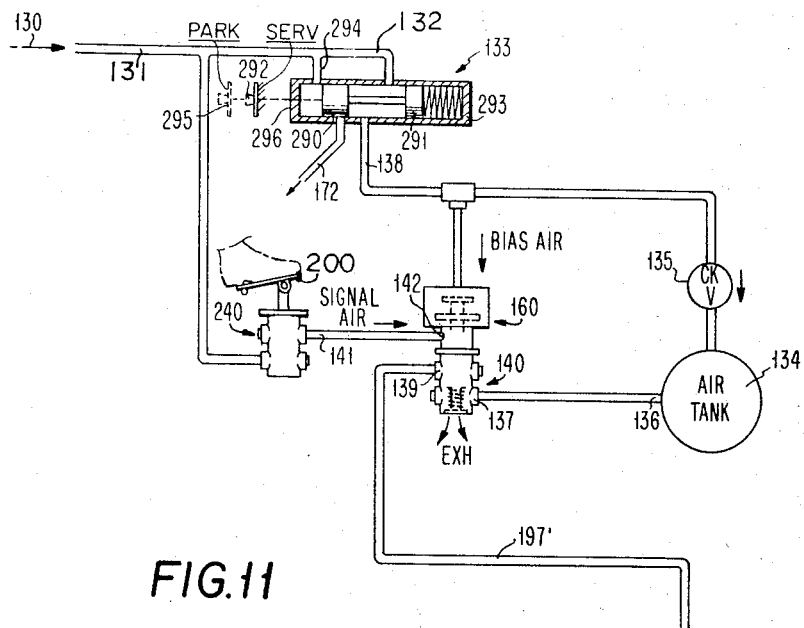
FIGURE 11 shows another embodiment of a spring applied brake system.

A system employing a fluid pressure signal to control reservoir pressures which in turn develop the forces to operate the brakes is shown schematically in FIGURE 11 as adapted for pneumatic operation, the fluid being compressed air.

The signal air system of FIGURE 11 comprises generally a source of fluid under pressure represented by the arrow 130. A first valve means 140 is disposed between the source of fluid pressure and the brake cylinders of the above type wherein spring forces are employed to urge a brake shoe into brake applying position. The first valve means is operable in one condition to transmit a fluid pressure into the brake cylinders to develop a force sufficient to overpower the spring biasing means in the brake cylinder. In another condition the first valve means 140 serves to vent fluid pressure from the brake cylinders to release stored energy of the spring biasing means.

In order to closely control operation of the first valve means in varying degree between the first and second condition mentioned above, an actuator 160 is provided which is responsive to, and disposed by, a biasing fluid pressure acting normally to fully condition valve means 140 to its brake releasing condition. A counteracting fluid pressure which can be varied is introduced to the actuator to operate valve means 140 in varying degree to its brake applying condition. Another valve means 240 is provided which is operable from the operator's compartment of the vehicle for both gradually and substantially instantaneously varying and directing fluid pressure from source 130 to the actuator to operate the actuator in a corresponding varying degree.

In short, a limited depression of valve means 240 generates a related limited fluid pressure signal which serves to correspondingly reduce pressure in the brake cylinders whereby the energy stored in the brake springs is partially released.

In general, operation of the system shown in FIGURE 11 proceeds as follows. Fluid pressure from source 130 is applied to a service line 131. Fluid pressure is carried along one branch 132 through a parking and emergency brake control valve 133 described further below. Pressure from branch 132 is applied to yieldingly urge or "bias" the actuator 160 in a downward direction and also supplies a predetermined pressure to an air receiver tank 134. Tank 134 is protected against any sudden drop in pressure by a chack valve 135 on the inlet side. The outlet 136 of tank 134 supplies fluid under pressure to the inlet port 137 of valve means 140 controlled by actuator 160. Under the normal biasing action of the pressure applied to actuator 160 via line 138 valve means 140 is conditioned to pass fluid under pressure from inlet 137 to outlet 139 and subsequently to the brake cylinder via line 197'. This fluid under pressure serves to move the piston of the brake cylinder to brake releasing position.

Means serving to control application of the brakes includes a foot-operated valve means 240 for developing a fluid pressure signal in line 141 to be applied through an inlet 142 whereby the biasing force developed by pressure in line 138 can be partially or fully overcome.

A foot pedal operated valve of known design, such as the Bendix-Westinghouse Corporation's Model E2 construction shown in FIGURE 18, can be used to provide a controlled air pressure serving as a fluid pressure signal.

When the brake pedal 200 (FIGURE 18) is pressed down by the driver's foot, force is exerted on the plunger 201, rubber graduating spring 202 and to the piston assembly 203. Vertical movement of assembly 203 serves to modulate or vary the source pressure so as to supply and maintain a selected brake "signal" air pressure. The signal air pressure can then be directed to control the venting of pressure in the brake acuator units. As the piston assembly 203 moves down, its stem including an exhaust seat 204 closes the exhaust, which is otherwise normally open. As the exhaust closes, the inlet valve 205 moves off its seat. Air pressure from the reservoir then enters gradually via inlet valve 205 and flows out at a selected pressure via delivery ports 206 to supply an air pressure "signal" to the system.

Assuming a given downward displacement of plunger 201, the "signal" air will develop and maintain a corresponding pressure. When the air pressure in the cavity beneath the piston and the air pressure which is being delivered via ports 206 equals the mechanical force depressing plunger 201, the piston lifts to close off further incoming air. The exhaust remains closed to prevent loss of the signal pressure established.

Thus, the valve seeks a balanced condition where pressure beneath the assembly 203 equals the effort exerted by the driver's foot. Maximum depression of plunger 201 serves to maintain the inlet valve fully open to deliver reservoir pressure.

If pedal 200 is released, the air pressure beneath the piston assembly 203 moves it upwardly to fully open the exhaust. Air below piston assembly 203 and in lines connected to ports 206 drops accordingly to atmospheric through the exhaust port.

Further explanation of the known valve construction shown in FIGURE 18 is not considered necessary. Identification of certain other elements may, however, be helpful. Thus, the construction includes a roller 209, retainer 210 for rubber spring 202, boot 211, return spring 212, spring 213, exhaust diaphragm 214, and a piston retainer cap 215.

Valve means 140 can be of similar construction to valve means 240 described above whereby downward movement of a plunger in varying degree serves to pass a proportionate pressure through the valve.

One embodiment of the valve actuator 160, and its relationship to a valve means 140, such as the Bendix-Westinghouse Corporation's Model E2 construction described above, is shown in FIGURE 12. Generally, the actuator includes a plunger arranged, whereby under pressure of the fluid source the plunger normally serves to condition valve means 140 to maintain the spring means of the brake cylinder in its fully restored condition. An inlet for applying to the plunger a counteracting fluid signal pressure is provided, either to partially or fully release stored energy of the brake springs, depending upon the degree of operation of foot pedal 200. Thus, the varying degree of signal pressure developed at the inlet correspondingly releases the stored energy of the brake spring means.

Figures 12, 13:
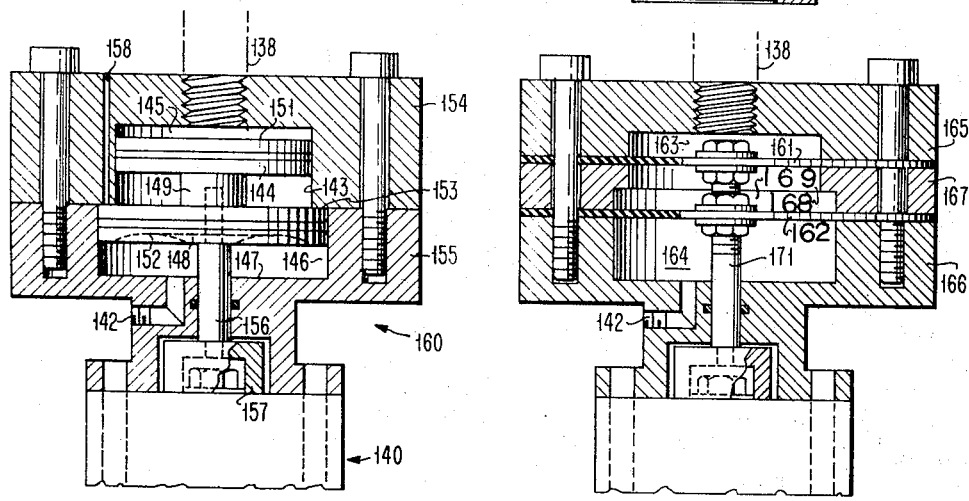
FIGURE 12 shows a valve actuating means employed in the system of FIGURE 11.
FIGURE 13 shows another embodiment of a valve actuating means as used in the system shown in FIGURE 11.

In the embodiment in FIGURE 12 the plunger means is arranged to comprise first and second expansible pressure chambers, each having a movable wall. The walls are of different pressure-receiving areas and are movable as a unitary construction between advanced and retracted positions. The pressure-receiving area of the movable wall of the first chamber is less than of the second chamber. A plunger actuator member or connecting rod is movable with the walls. Fluid passage means are provided normally passing fluid pressure from the pressure source into the first fluid pressure chamber to urge the movable walls and the valve actuator member to its advanced position. The inlet for applying a counteracting fluid signal pressure is disposed to pass fluid pressure into the second expansible chamber under control of valve means 240 to urge the movable walls toward their retracted position.

Particularly, an expansible pressure chamber 145 is defined by the cylinder 143 and piston head 144 movable therein. A second expansible chamber 146 is defined by a cylinder 147 and piston head 148. Heads 144 and 148 are held in fixed spaced relation by an axial rod portion 149. The pressure-receiving face 151 of head 144 provides a pressure-receiving area smaller than the pressure receiving face 152 of head 148. Accordingly, with equal pressure applied to faces 151 and 152, the piston head construction will be moved upwardly to a retracted position defined by an annular shoulder 153 provided by the cylinder block 154. Cylinder block 155 is bolted to block 154 and, if desired, suitable sealing gaskets can be provided therebetween, if consideration is properly given to variation of the stroke of member 156.

Plunger actuator member 156 is screwed axially into the piston head assembly and carried between advanced and retracted positions thereof. At the bottom end of member 156 a cylindrically shaped cup 157 is disposed to contact and depress plunger 201 of valve means 140 described above. As previously explained, downward depression of plunger 201 serves to transmit fluid pressure from inlet 137 (FIGURE 11) to outlet 139, thereby moving the brake pistons to brake releasing condition. During movement of the piston head assembly between advanced and retracted positions, it will be observed that the volume of the dead air space defined between piston head 144 and piston head 148 will correspondingly increase or decrease depending upon the direction of movement of the head assembly. A fluid vent 158, bored through cylinder block 154 and terminating in shoulder 153, is disposed to provide breathing for this dead air space. Furthermore, vent 158 serves to provide access for lubrication of piston heads 144, 148 on the low pressure side of each.

A fluid signal pressure inlet 142 (FIGURE 11) serves to inject a counteracting fluid pressure into chamber 146 to partially or fully overcome a biasing force developed by pressure injected into chamber 145 via line 138. Member 156 can therefore be moved in varying degree to a selected position to control the fluid pressure at outlet port 139.

Another embodiment of the valve actuator is shown in FIGURE 13 wherein the expansible walls are provided by resilient deformable diaphragms 161, 162 each sealed at its periphery to the wall of its respective expansible chamber 163, 164. Chambers 163, 164 are respectively provided by a cylinder block 165, a cylinder block 166 and an intermediate cylinder section 167. Section 167 is formed with a pair of openings 168, 169 bored from opposite faces to provide sealing surfaces to support the back side of each diaphragm 161, 162 and permit flexing thereof. Accordingly, the back surface of each diaphragm is supported around a circumference corresponding to that of its chamber 163, 164. A stem 171 is carried by diaphragms 161, 162 and movable therewith by means of the hexagonal nuts and washers shown. Accordingly application of a fluid bias pressure, via line 138, serves to drive stem 171 downwardly to the advanced position whereas application of a counteracting pressure via inlet 142 serves to provide a counteracting force to move stem 171 in an opposite direction thereby applying the brakes.

Valve means 133 serves to provide a parking and emergency brake function controlled manually from the cab of the vehicle or automatically in response to a pressure drop in the fluid pressure source.

It should be noted that a spring is disposed in valve means 140 to urge plunger 201 (FIGURE 18) upwardly when pressure is relieved from line 138 at times when no counteracting pressure is applied via inlet 142.

In general, a large capacity valve 133 is disposed upstream of actuator means 160. Valve 133 is positionable whereby in one condition, it transmits a biasing fluid pressure to the actuator. Valve 133, when moved from the position shown in FIGURE 11 serves to quickly relieve the biasing pressure through a vent 172 leading to a low pressure area such as the outside surroundings. Accordingly, venting bias pressure from line 138 by means of valve 133 serves to permit the spring in valve means 140 to move plunger 201 (FIGURE 18) and actuator means 160 upwardly to its brake applying position.

In order to release the brakes, it is necessary to reapply a downward force to actuator means 160. This release movement depends upon provision of a source of fluid under pressure in line 138. Spools 290, 291 of valve 133, when moved to the left as shown in FIGURE 11, connect lines 172 and 138 to vent the bias pressure from valve actuator 160 causing brakes to be applied. Manual control by pulling out the parking knob 292, vents the bias line 138. Service system pressure in line 132 normally serves to restrain spring 293 by a force developed via bleed line 294. When knob 292 is pulled to the "park" position, 295, pressure from line 132 cannot enter the valve housing 296 and, therefore, spring 293 serves to keep the valve in its "park" position.

As a pressure sensing means, spring 293 serves to overcome unusually low pressure in line 132 to apply the brakes by venting the line 138. Manual reset is subsequently required so as to impart an additional safety factor to its operation.

Figure 19:
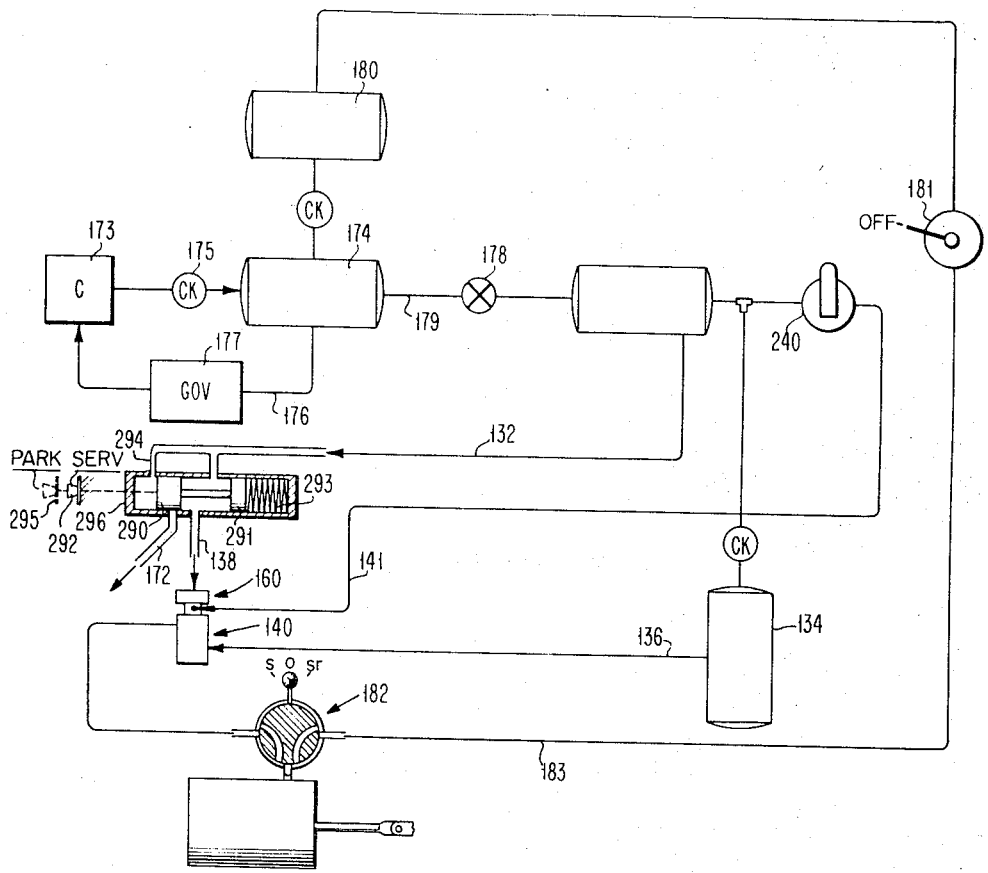
FIGURE 19 shows another embodiment of a spring applied brake system.

Another "fluid pressure signal" type system employing an actuator means controlled by receipt of fluid pressure "signals" and operating to counteract a bias pressure to release stored energy of springs in a braking system is shown in FIGURE 19. The system in FIGURE 19 includes a fluid pressure source including a compressor 173 supplying fluid under pressure to a reservoir 174 through a check valve 175. A recirculating line 176 incorporating a governor 177 provides a return to compressor 173. A fluid shutoff means 178 is provided by a pet cock in an output line 179 leading from reservoir 174. When shutoff means 178 is disposed to disconnect reservoir 174 from primary service system elements downstream thereof a standby emergency system for limited operation of the brakes can be activated.

The emergency standby system generally includes a spare fluid pressure reservoir 180 protected by a check valve so as to form a second source of fluid under pressure when used in combination with compressor 173 and reservoir 174 or, in the event of the failure of either of the latter, can be used by itself for a limited period. Thus, when compressor 173 and reservoir 174 are fully operative, compressor 173 will serve to maintain pressure in reservoir 180 at a predetermined level via reservoir 174. Where so called "wet" and "dry" tanks are required in order to comply with motor vehicle regulations or physical system performance, reservoirs 174, 180 can be employed to meet this requirement. The standby system further includes a hand-operated valve 181 connected to vary and transmit pressure from reservoir 180 directly to the brake cylinders so as to release the brakes in a corresponding degree dependent upon manipulation of valve 181. Valve means 140 or 240 can serve this purpose when modified for hand control as by employing a hand lever rotating a camming portion to move plunger 201 (FIGURE 18) as desired. A closed center three-way valve 182 is disposed immediately upstream of each brake cylinder whereby the fluid pressure line 183, can be selectively connected or disconnected to control the brake cylinder. Valve 182 can also be conditioned to selectively connect and disconnect the primary service brake system when in position identified by the letter "s," as well as being able to be disposed to disconnect the brake cylinder entirely from both systems.

Operation of the primary service system of the arrangement in FIGURE 19 follows substantially along the lines of the system previously described with respect to FIGURE 11 and accordingly it is not considered necessary to repeat that description at this time.

As noted above, emergency braking has been effected in the past, by means of spring forces which are released upon failure of the air system. I have observed that while these springs have been sufficient to serve as "parking" brakes, their operation has been of such limited effectiveness that in a number of jurisdictions it has even become unlawful to refer to them as "emergency" brakes. I have further observed that their effectiveness is reduced by reason of requiring them to remain compressed over long periods of time, extending for example, into days and weeks. Furthermore, the flexing life of single large sized springs as used in many emergency braking systems is relatively short.

Accordingly, I have provided preferred braking means as now to be described which can be operated either hydraulically or pneumatically in each of the above described systems, and which will provide satisfactory operation over an extended period relative to the life of the vehicle itself.

In general, the brake cylinders as designated by the reference numeral 90 (FIGURES 5 and 10), each include a cylinder, a piston movable within the cylinder, and a connecting member carried by the piston for moving the brake shoes between brake-applying and brake-releasing positions. Resilient biasing means are provided to yieldingly urge the piston with respect to the cylinder to move the connecting member.

The resilient biasing means preferably comprises a number of helical springs, each having an axis spaced from the axis of the cylinder and extending substantially parallel to the cylinder axis. The axes of the springs are spaced from each other and distributed around the cylinder axis, thereby providing a long-lived and powerful spring biasing means. A fluid receiving space is defined between one end of the cylinder and the piston and adapted to be pressurized either by hydraulic fluid or by pneumatic means to overcome the urging of the powerful resilient biasing means. In a particularly preferred embodiment, plural banks of short, lightweight helical springs are provided within the cylinder and separated by a plate which is mutually supported by the adjacent banks. Thus, the banks are arranged in tandem generally axially of the cylinder. Should any one of the springs become defective, it will have virtually no harmful effect upon the overall braking efficiency of the cylinder.

In particular, a cylinder 90 is provided with an end cap member 92 formed with an annular skirt 93. Skirt 93 is adapted to extend coaxially into cylinder 90 and is welded at 94 to form a sealed closure. The inner surface of member 92 is formed to include a number of cylindrical seats 95 adapted to receive helical springs 96 therein.

At the other end of cylinder 90 a movable piston 97 is carried to ride on a pair of relatively widely spaced O-rings 98a, 98b, disposed around the axially extending skirt 99 of piston 97. The relatively wide axial spacing between O-rings 98a, 98b, serves to prevent "binding" of piston 97 within cylinder 90. The end surface inside piston 97 is formed to provide circular seats 101 substantially aligned with corresponding seats 95. Springs 96, in the main, are distributed substantially parallel to and spaced from the axis of cylinder 90 as well as being spaced from each other. Two of the springs 96 are disposed coaxially of cylinder 90 and positioned in tandem. The ends of springs 96 are carried in seats 95, 101 and can (in another embodiment) extend continuously from one end to the other. However, the arrangement employing a relatively large number of springs arranged in two tandem banks extending along the axis of cylinder 90 is preferred. As noted, the two banks are separated by a plate 102 mutually supported by the springs of both banks.

Plate 102 is formed with oppositely extending boss portions 103, 104. Portions 103, 104 fit within an end convolution of the springs to carry them respectively between boss portions 103, 104 and seats 95, 101. A cylindrically shaped opening 105 extends through plate 102 coaxially of each pair of boss portions 103, 104. With the exception of that opening 105 disposed coaxially of cylinder 90, openings 105 serve to receive cylindrical guide members 106 which are carried substantially coaxially within springs 96 and mounted in seats 95. The peripheral edge of plate 102 carries an O-ring 107 to take up any abrasive wear which might otherwise be encountered by springs 96. Guide cylinders 106 are preferred mostly for use with long springs extending end to end in cylinder 90 when not employing plate 102. Thus, as shown, plate 102 can, if desired, be removed and longer springs be employed.

In order to reject moisture which might otherwise tend to accumulate within cylinder 90, when used as a pneumatic system, the cylindrical space defined between the inner surface of member 92 and of piston 97 includes a free volume of water-rejecting lubricant, such as motor oil. It is preferred for most purposes that the amount of this free volume of oil be on the order of a quart as distinguished from slight deposits as might be used for mere lubrication. In the embodiment shown in FIGURE 6, means for passing the motor oil into cylinder 90 include a filling cap 307 screwed onto an exteriorly threaded boss 120.

Means for sealing, substantially moisture-free the space defined between member 92 and piston 97 from the space 100 defined between the piston head and the adjacent end of cylinder 90 includes, in addition to the pair of spaced O-rings 98a, 98b, an encircling "wick" 108 of suitable absorbent material such as felt, carried in wiping engagement with the side wall of cylinder 90. Wick 108 is disposed near the trailing edge of skirt 99 so as to be interposed between the moisture-free space and O-ring 98b. Plate 102 includes fluid transfer holes 102a to insure free movement of the oil thereacross, from one side to the other.

Figure 6:
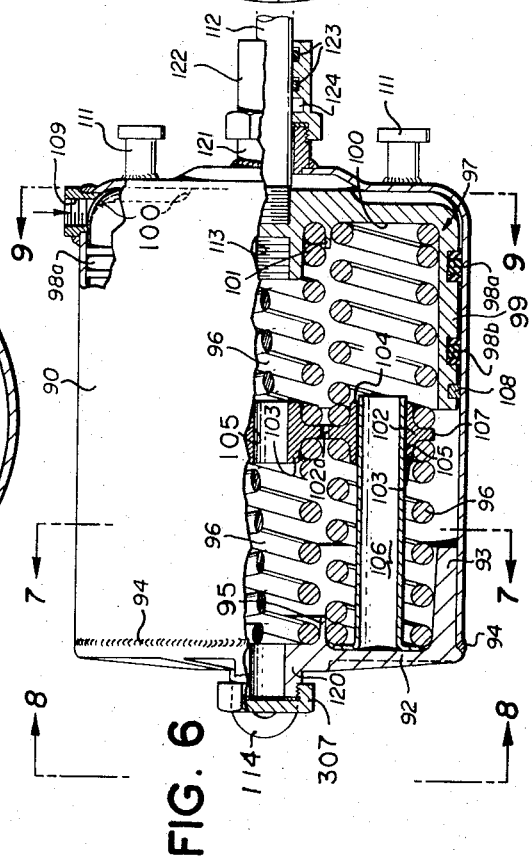
FIGURE 6 is a side elevation view partly in section of a brake actuator, according to the invention.

Piston 97, as shown in FIGURE 6, is in fully extended position. This condition normally will not exist while the cylinder is mounted on the vehicle but rather is representative of the condition of piston 97 prior to installation. In this condition, the head of piston 97 abuts the end of cylinder 90. Fluid passage means for pressurizing and later controlling piston 97 against the urging of springs 96 includes the relatively large port 109. Port 109, being relatively large, is not subject to becoming clogged with grit, dirt and the like as has been a common source of air brake problems.

Prior to installation, port 109 is connected to the compressed air supply whereby space 100 can be subjected to pressure. In order to provide sufficient active pressure-receiving area to enable installation to be made, means are provided for injecting fluid under pressure, between the end surface of piston 97 and the abutting end of cylinder 90. Thus the end surface of piston 97 includes a plurality of radially extending depressions 110 providing sufficient pressure-receiving area in fluid communication with port 109 whereby sufficient force is generated to overcome the spring biasing means. With the piston partially retracted under fluid pressure, cylinders 90 can be connected up and mounted to the vehicle.

Figure 8:
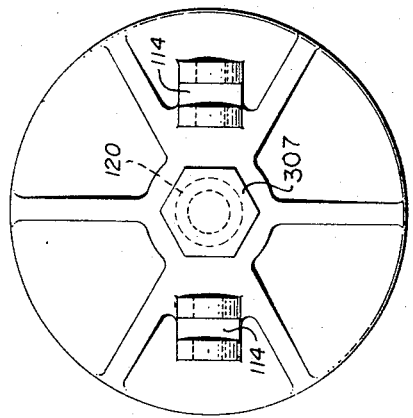
FIGURE 8 is an end view along the line 8—8 of FIGURE 6.
Figure 9:
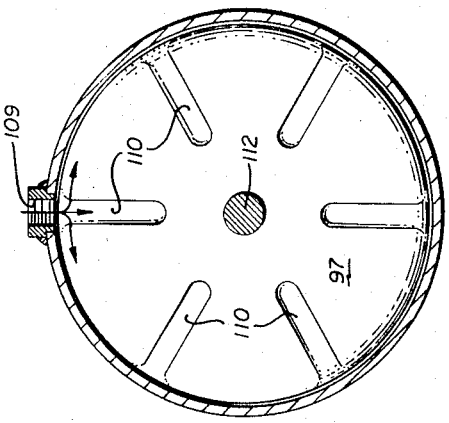
FIGURE 9 is a section view along the line 9—9 of FIGURE 6.
Figure 7:
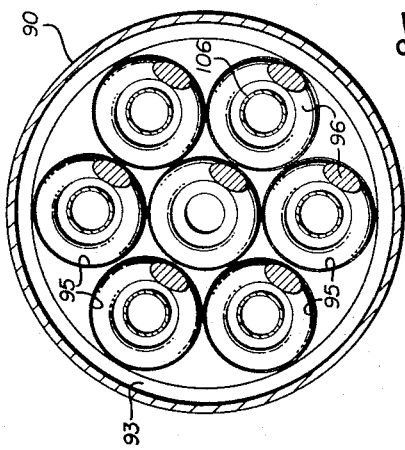
FIGURE 7 is a section view along the line 7—7 of FIGURE 6.

As shown in FIGURE 5, the brake shoes 117 are arranged to be moved to a brake "set" position by clockwise rotation of lever arm 116. A connecting member or rod 112 can be threadedly engaged in the end of piston 97 and connected at its other end in the system as shown in FIGURE 5. It should be noted that in FIGURES 5 and 6, rod 112 is arranged whereby movement to the right, i.e., "pushing" on rod 112, serves to move the brake shoes to brake-applying position. In this instance cylinder 90 can be mounted by studs 111. Rod 112 extends through an exteriorly threaded boss 121 which in turn carries a removable gland member 122 provided with a pair of O-rings 123 and wiper 124.

Where it is desired to move the brake shoes to brake applying position by "pulling" on rod 112, rather than by a pushing action, rod 112 can be readily removed and passed through the opposite end of cylinder 90 via boss 120 until it engages threads 113 in piston 97. In the latter event, cylinder 90 can be carried on the vehicle by means of a pair of radially spaced brackets 114 (FIGURE 8). When brackets 114 are used to mount cylinder 90, the double-pivoted clevis 115 (FIGURE 5) can be replaced by a single connecting pin inasmuch as brackets 114 serve to permit cylinder 90 to rock slightly to compensate for the arc defined by the upper end of lever arm 116. In the "pulling" arrangement (FIGURE 10), boss 120 serves as a filling opening to permit moisture rejecting oil to be supplied to cylinder 90, prior to insertion of rod 112.

From the foregoing description, it will be evident that failure or fatigue of any of springs 96 is easily compensated by means of plate 102. At the same time, a powerful spring force is provided while taking advantage of the longer flexing life of short, lightweight springs which can be on the order of conventional automotive valve springs.

As shown in FIGURE 10, piston 97 moves to an intermediate position in cylinder 90 when the brake shoes are fully applied. It will be evident from the spacing between the piston head and the adjacent end of cylinder 90 that considerable "throw" is left in reserve. Thus, if the brake linings are entirely destroyed, the brake shoes can nevertheless be further driven if need be, even into metal-to-metal contact with the drums after destruction of the linings whereby the shoes and drum will fuse under heat generated thereby. With this reserve throw, the problem of "fading" is virtually eliminated.

While the throw of member 112 is considerably increased, the over-all extent of cylinder 90 remains as short or shorter than conventional units.

If it is desired to operate without benefit of plate 102 helical springs sufficiently long to extend from member 92 to the inner surface of piston 97 can replace the tandem pairs of shorter springs shown. In this event, cylindrical guides 106 serve to maintain the springs in an aligned condition whereby the springs do not interfere with one another or with the operation of piston 97.

As noted above, a commercially acceptable brake unit for the above systems must provide the flexing qualities characteristic of low force springs while developing a satisfactory spring force to actuate the brakes. This must be achieved, however, while avoiding the adverse buckling and cocking normally encountered at those convolutions located respectively either midway between, or at the ends of the spring. It will also be recalled that the compression spring means used should provide a sufficiently long stroke to eliminate the fading problem without significantly extending the length of the brake cylinder unit beyond conventional lengths.

In providing spring biasing forces sufficient to be employed in service braking operation of a vehicle, such as a heavily laden tractor-trailer rig, spring life is obviously important. It is generally considered that compression springs, for best results, should be limited to a maximum flexure of half their length for springs having a length three times their coil diameter. Thus, for a spring of two-inch coil diameter a preferred length (3:1) of six inches should not be compressed in normal operation much more than three inches. Therefore, as shown above, seven springs of roughly two-inch coil diameter are arranged in a single bank to generate sufficient braking force at the wheels. A second, and similar bank of springs is added to develop a preferred rather extended throw of the piston.

At this point, if additional spring force is to be developed, more powerful springs or additional springs can be used. The former will lose some of the flexing advantage of lower power springs, while the latter will either require an increased brake cylinder diameter or use of springs of a smaller coil diameter. If the springs are to be of equal length of the seven two-inch diameter springs shown, their diminished coil diameter will violate the rule of diameter to length stated above for preferred performance.

I have observed, however, that if the axis of these smaller diameter springs is closely confined during flexure whereby lateral movement of the axis is restrained, the 3:1 preferred relationship can be disregarded without adverse effect. I have further observed that as the ratio of length to coil diameter increases, the wire diameter of the spring normally will be decreased to provide further improved flexing life. Thus, in a particularly preferred embodiment (FIGURE 14) described below, I have employed a nested helical spring construction wherein a plurality of three helical springs are concentrically disposed, the outer spring having substantially the optimum 3:1 relation of length to coil diameter. The outer spring employs a helix of opposite hand to the next adjacent inner spring and this scheme has been found to provide excellent lateral restraint such as when a close spaced sliding fit relation on the order of .010 inch is employed. The free volume of oil within the cylinder provides spring lubrication.

To further preclude lateral movement of the spring axis, a guide post is telescopically carried axially of the nested springs and supported from the divider plate. The divider plate serves, as above, to permit the axial displacement of the brake piston to be effectively doubled without detriment, such as fracture of the springs midway between the sprung and unsprung masses.

The divider plate, while supported by the helical spring arrangement on each side, is formed slightly spaced from the side wall of the cylinder to accommodate any limited tilting movement thereof caused by failure of one of the springs. At one end of the springs, the guide posts are formed with a tapered enlargement of their diameter to provide an axial seat within an end convolution of the innermost spring. A coaxial annular seat encircles the end convolution of the outermost spring. At the other end of the nested springs, an annular recessed surface and peripheral rim form a seat while a circular boss protrudes coaxially within the innermost spring.

The guide posts are sufficiently elongated whereby, upon maximum spring compression, they will extend axially of the springs to within a slight spaced relation with respect to the boss aligned therewith thereby ensuring that the end convolutions of the springs do not become unseated or cocked at an angle as can be caused by the twist generated in spring compression movement.

The skirts of the piston and cylinder end-cap, and the outer margin of the divider plate meet when the piston is at its full spring compression position so as to define the maximum spring compression relation, and evenly relate the load between each bank, while precluding coil contact.

The arrangement as described in general above is shown in detail in the embodiment of FIGURES 14 through 17.

A brake cylinder 250 is formed with a relatively thick end portion 251 to accommodate a rather large diameter fluid passage 252 for admitting fluid under pressure into the interior of cylinder 250. The other end of cylinder 250 is, as formed, open. To seal the open end of cylinder 250 an end cap 253 is welded at 254. Cap 253 is provided with a skirt 255 of equal axial extent to a skirt 256 of a movable piston 257. Piston 257 is formed with a piston rod 258 for connection to a brake actuating cam lever such as shown at 116 in the system in FIGURE 5. In order to support the brake unit in its installed position, a pair of mounting studs 259 (only the far one of which is shown) are formed to protrude from end portion 251 on opposite sides of piston rod 258.

In order to provide breathing for that portion of the interior of cylinder 250 that is defined between skirts 255 and 256, a fluid passage fitting 261 is provided coaxially of end cap 253. As noted above, the interior of cylinder 250 carries a small deposit of water-repellant lubricant and this lubricant can therefore, be injected into the cylinder via fitting 261.

The divider plate 262 is formed at its periphery to receive an O-ring whereby plate 262 moves axially along the cylinder with a loose fit, on the order of a sixteenth inch radial clearance to accommodate a slight tilt if a spring should fail. Plate 262 carries a plurality of guide posts 263 of preferably solid construction from end to end. Posts 263 are formed at their midpoint with a tapered enlargement 264 of their diameters to snugly receive the end convolution of the innermost helical spring 265.

A nested arrangement of three springs 265, 266 and 267 is slidably supported around each of the seven guide posts 263. In the drawings, for sake of clarity and simplicity of illustration, only a pair of nested tandemly aligned springs so arranged has been shown. The helix of the innermost and outermost springs, respectively 265, 267, is of the same "hand" whereas the helix of spring 266 is of an opposite "hand" whereby entanglement of adjacent springs is precluded and smooth sleeve-like guidance of each spring achieved. The coils of springs 265– 267 are radially spaced from one another to provide a slight sliding clearance on the order of .010 inch, thereby restraining lateral movement of their common axis. The free volume of lubricant in the cylinder aids relative axial movement therebetween.

At the ends of the outermost springs 267 located remote from plate 262 an annular seat is provided to encircle the end convolution of the spring to ensure that the end convolution of the springs will not become unseated or cocked at an angle under the twisting movement generated by spring compression. Thus the annular seat includes a protruding boss 268 axially aligned with its respective guide post 263. A recessed annular surface 269 encircles boss 268 and the outer periphery of surface 269 is formed to include an axially extending rim portion 270.

Guide posts 263 are sufficiently elongated whereby upon maximum spring compression, as defined by abutment between skirts 255, 256 with the peripheral margin of plate 262, a slight spacing 271 (FIGURE 17) serves to prevent the springs from becoming unseated during operation of the brake cylinder. Spacing 271 can preferably be on the order of one or two thicknesses or less of the wire diameter of the innermost spring.

Divider plate 262 is further provided with fluid passages or ports 272 (FIGURE 16) for equalizing the transfer of fluid between each side of plate 262.

As shown in FIGURE 14 the piston head 257 is adapted to abut the inner end surface of cylinder 250. This condition, while normally not existing during operation of the brake unit, will exist prior to installation of the brake unit on a vehicle. Accordingly, at the time of installation it will be necessary to inject fluid pressure between the inner end of cylinder 250 and piston 257. The pressure must be sufficient to develop a force which will overcome the biasing force of the springs within the cylinder. The pressure-receiving surface of piston 257 which is adapted to abut the inner end of cylinder 250 is therefore formed (FIGURE 15) to include alternately raised and relieved areas closely spaced to uniformly distribute the loading of the spring biasing forces acting against the piston head from the other side when the head is in its abutting condition.

Uniform distribution of these spring forces generally across the entire face of piston 257 is necessary to prevent cracking or distortion of the piston head, as will be readily apparent when it is considered that somewhere on the order of 4200 pounds of force is developed by springs employed in the embodiment shown in FIGURE 14.

This force can be developed using a spring 267 developing 300 pounds of force, a spring 266 developing 200 pounds of force, and a spring 265 developing 100 pounds of force. The spacing and extent of the surface areas provided by raised portions 274 must not, however, preempt the provision of a sufficiently large pressure receiving area formed by the recessed portions 275 which are in fluid communication with the fluid passage 252 so as to receive fluid pressure and develop a force which can overpower the force of the spring biasing means. Accordingly, the arrangement shown in FIGURE 15 has proven satisfactory for accommodating both of the foregoing requirements.

Simpler embodiments of the above construction are shown in FIGURES 20 and 21. In FIGURE 20, for example, there is shown a brake unit of the above described kind wherein spring forces are employed to drive a piston to brake applying position which includes a plurality of helical springs 280, 281 disposed in concentric closely spaced relation, wherein the helices of the adjacent springs are of opposite hand to each other and the spaced relation between the springs measured radially thereof is sufficiently close whereby the outer spring serves to guide and confine the adjacent spring movement substantially to axial movement thereof. It will also be observed that posts 282, 283 are axially aligned coaxially of springs 280, 281 and are elongated to provide a close spaced relation at their ends. Vent 284 provides breathing.

As shown in the embodiment of FIGURE 21 a brake cylinder unit of simplified construction includes a single helical spring 285 having a powerful spring constant and a guiding divider plate. Thus, helical spring means act axially of the cylinder and are disposed around cylindrically shaped guide means 286 extending a substantial distance along the cylinder concentrically of and closely spaced from the helical springs 285 so as to slidably confine the axis of springs 285 and substantially preclude lateral movement thereof during longitudinal movement of the piston 287.

From the foregoing it will be evident that a system of the above kind, made commercially feasible by the actuating units described, will have a number of operating advantages as previously noted.

I claim:

1. Brake actuating apparatus comprising a connecting member adapted to be moved to operate a brake shoe between brake applying and brake releasing positions, a cylinder, a piston movable within the cylinder to move the member, spring biasing means providing a source of stored energy to drive said member to brake applying position, said biasing means including at least two banks of helical springs within said cylinder and disposed to move said piston in brake applying direction, a plate separating said banks and mutually supported by both, each bank including a plurality of springs, each having an axis extending substantially parallel to the cylinder axis, the axes of the springs being spaced from each other and distributed around the cylinder axis, and a fluid receiving space defined between one end of the cylinder and the piston and adapted to be pressurized to overcome the urging of said spring biasing means.

2. Brake apparatus as defined in claim 1 wherein said fluid receiving space is adapted to be pressurized by pneumatic means, and further including another fluid receiving space defined between the other end of said cylinder and said piston adapted to receive a free volume of water-rejecting lubricant in same.

3. Brake actuating apparatus according to claim 1 wherein the periphery of said plate moves slidably along the inner wall of said cylinder and includes fluid transfer openings throughout.

4. Brake apparatus as defined in claim 2 further including means for sealing the last named space substantially moisture-free from the first named space, the last named means comprising a pair of spaced O-rings supporting said piston within said cylinder, and an encircling absorbent wick carried by said piston in wiping engagement with the side wall of the cylinder, the axial disposition of said wick being between said last named space and said O-rings.

5. Brake apparatus as defined in claim 4 wherein said lubricant is oil and said wick is formed of felt.

6. Brake actuating apparatus comprising a connecting member adapted to be moved to operate a brake shoe between brake applying and brake releasing positions, a cylinder, a piston movable within the cylinder to move the member, spring biasing means providing a source of stored energy disposed to drive said member to brake applying position, said biasing means including first and second right cylindrical helical spring means tandemly disposed in said cylinder and of substantially equal force, a rigid, movable plate assembly extending transversely in a single plane and slidably engaging the wall of said cylinder and separating said first and second helical spring means and mutually carried along said cylinder by both said spring means, and a fluid receiving space defined between one end of the cylinder and the piston adapted to be pressurized to overcome the urging of said spring biasing means, an elongated cylindrically shaped guide member carried by the plate to extend along said cylinder and disposed snugly coaxially within said helical springs to confine the axis of said springs and substantially preclude lateral movement of said axis during longitudinal movement of the piston.

7. Brake actuating apparatus comprising a connecting member adapted to be moved to operate a brake shoe between brake applying and brake releasing positions, a cylinder, a piston movable within the cylinder to move the member, spring biasing means providing a source of stored energy disposed to drive said member to brake applying position, said biasing means including first and second helical spring means tandemly disposed in said cylinder, a rigid plate assembly extending transversely in a single plane and separating said first and second helical spring means and mutually supported by both, the outer edge of said plate assembly slidingly engaging the wall of the cylinder, said helical spring means on each side of said plate assembly including a plurality of helical springs disposed concentrically of one another, the helices of adjacent springs being of opposite hand, and a fluid receiving spaced defined between one end of the cylinder and the piston adapted to be pressurized to overcome the urging of said spring biasing means, said plate assembly including fluid passages therethrough for freely transmitting fluid from one side to the other.

8. Brake actuating apparatus comprising a connecting member adapted to be moved to operate a brake shoe between brake applying and brake releasing positions, a cylinder, a piston movable within the cylinder to move the member, spring biasing means providing a source of stored energy disposed to drive said member to brake applying position, said biasing means including first and second helical spring means tandemly disposed in said cylinder, a plate separating said first and second helical spring means and mutually supported by both, a fluid receiving space defined between one end of the cylinder and the piston adapted to be pressurized to overcome the urging of said spring biasing means, elongated cylindrically shaped rigid guide posts carried by said plate to extend substantially normal thereto and coaxially disposed within each of said springs to confine the axis of the latter to substantially preclude lateral movement of said axis during longitudinal movement of the piston, said guide posts being tapered to enlarge their diameter and form an axial seat within an end convolution of the springs.

9. Brake actuating apparatus comprising a connecting member adapted to be moved to operate a brake shoe between brake applying and brake releasing positions, a cylinder, a piston movable within the cylinder to move the member, spring biasing means providing a source of stored energy disposed to drive said member to brake applying position, said biasing means including first and second helical spring means tandemly disposed in said cylinder, a plate separating said first and second helical spring means and mutually supported by both, said helical spring means on each side of said plate including a plurality of helical springs disposed concentrically of one another, the helices of adjacent springs being of opposite hand, and a fluid receiving space defined between one end of the cylinder and the piston adapted to be pressurized to overcome the urging of said spring biasing means, said piston and the end of said cylinder each being formed with annular recessed seats dimensioned to receive the end convolution of the outermost one of said concentric springs, said seats being further formed to include a raised annular alignment boss disposed concentrically of and snugly received within the innermost one of said concentric springs, elongated posts carried by said plate and axially aligned with said bosses to confine lateral movement of the axis of said springs.

10. Brake system apparatus as defined in claim 9 further including means defining positive limits of spring compression disposing the ends of said posts with only a slight spaced relation between the post ends and a related one of said bosses thereby retaining said springs within said seats.

References Cited
UNITED STATES PATENTS

| | | | |
|---|---|---|---|
| 372,890 | 11/1887 | Boyden | 188—170 |
| 1,605,747 | 11/1926 | Magness | 188—170 |
| 1,681,579 | 8/1928 | Farmer | 92—165 X |
| 1,715,406 | 6/1929 | Christenson | 92—130 |
| 2,355,520 | 8/1944 | Fischer et al. | 92—130 X |
| 2,437,631 | 3/1948 | Wood | 267—1 |
| 2,673,483 | 3/1954 | Bird | 188—170 X |
| 3,101,133 | 8/1963 | House et al. | 188—170 |
| 3,144,812 | 8/1964 | Rager et al. | 92—64 X |

FOREIGN PATENTS

| | | |
|---|---|---|
| 548,546 | 4/1932 | Germany. |
| 84,061 | 8/1935 | Sweden. |

MARTIN P. SCHWADRON, *Primary Examiner.*

I. C. COHEN, *Assistant Examiner.*